(12) United States Patent
Morrison

(10) Patent No.: US 6,335,751 B1
(45) Date of Patent: Jan. 1, 2002

(54) SYSTEM AND METHOD FOR RENDERING AN OUTPUT IMAGE ONTO AN IMAGE TRANSFER SURFACE USING MULTIPLE OPTICAL SCAN PATHS

(75) Inventor: Robert D. Morrison, Star, ID (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/534,802

(22) Filed: Mar. 24, 2000

(51) Int. Cl.[7] .............................................. B41J 2/435
(52) U.S. Cl. ...................................... 347/235; 347/250
(58) Field of Search ................................. 347/235, 237, 347/239, 247, 250, 255, 232, 248; 358/474

(56) References Cited

U.S. PATENT DOCUMENTS

| | | | | |
|---|---|---|---|---|
| 4,777,496 A | | 10/1988 | Maejima et al. ............ 347/172 |
| 5,274,398 A | * | 12/1993 | Ban ............................ 347/232 |
| 5,438,353 A | | 8/1995 | Morrison ..................... 347/250 |
| 5,489,936 A | * | 2/1996 | Appel et al. ................. 347/248 |
| 5,671,069 A | * | 9/1997 | Kodama ...................... 358/474 |
| 5,760,816 A | | 6/1998 | Morrison ..................... 347/247 |

* cited by examiner

Primary Examiner—Hai C. Pham

(57) ABSTRACT

A system is provided for rendering an output image on an image transfer surface using multiple optical scan paths in an image rendering device. The system includes a plurality of lasers, a plurality of scan time detectors, and processing circuitry. Each of the lasers is configured to generate an optical scan path on the surface. Each scan time detector is associated with a corresponding laser and is operative to measure scan time of the laser along the respective optical scan path. The processing circuitry communicates with each scan time detector and is operative to generate a video signal having a video frequency associated with the scan time detected for the respective laser. A method is also provided.

19 Claims, 2 Drawing Sheets

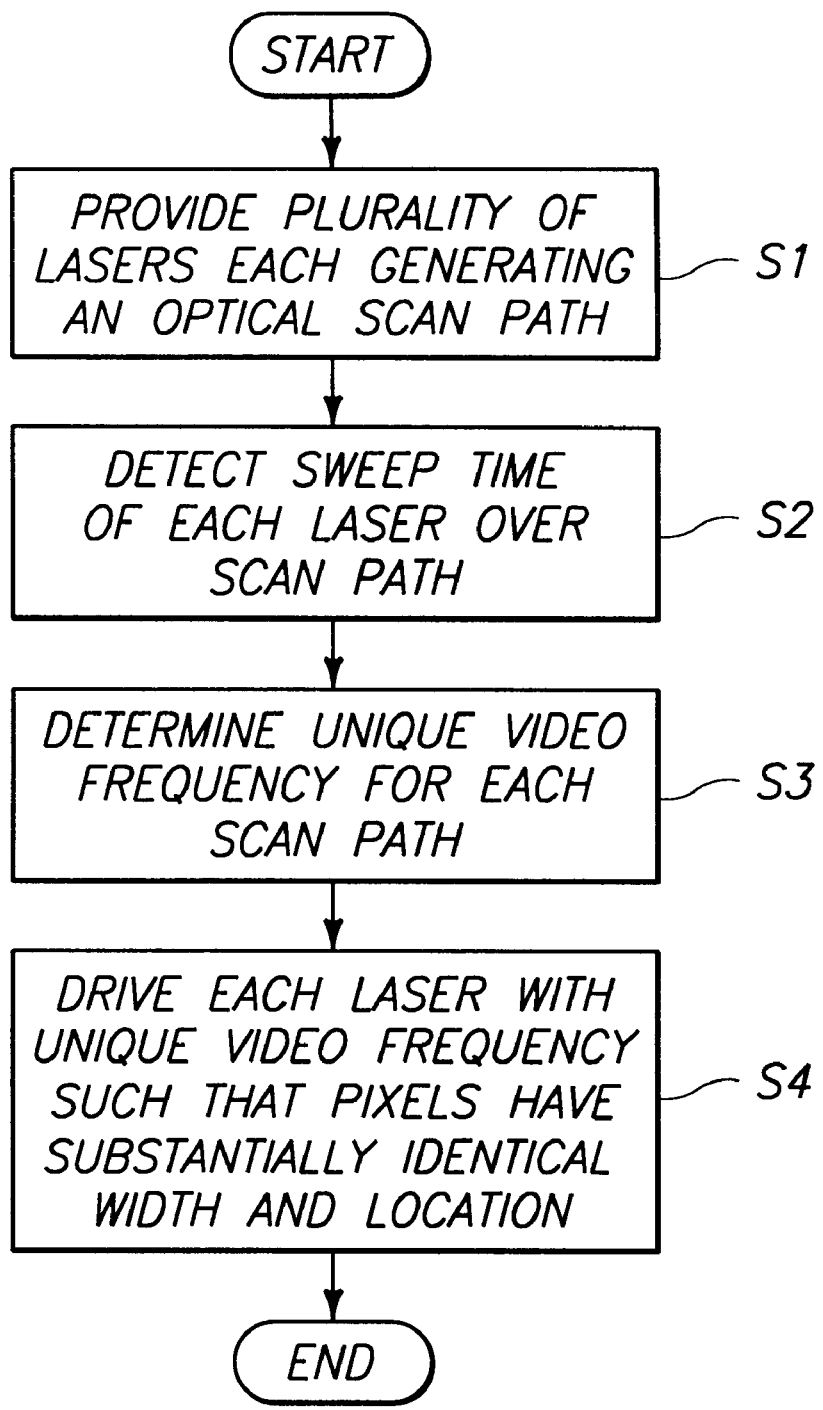

SYSTEM AND METHOD FOR RENDERING AN OUTPUT IMAGE ONTO AN IMAGE TRANSFER SURFACE USING MULTIPLE OPTICAL SCAN PATHS

FIELD OF THE INVENTION

This invention pertains in general to image transfer technology. More particularly, this invention relates to pulse width modulation of multiple lasers within an image forming device such as a laser printer.

BACKGROUND OF THE INVENTION

Pursuant to laser printer technology, a latent image is created on a surface of an insulating, photo-conducting material by selectively exposing areas of the surface to light. For the case of a laser printer, the surface is in the form of a rotating drum. A difference in electrostatic charge density is created between areas on the surface depending on the degree to which such areas are exposed to light. A visible image is then developed on the drum using one or more types of electrostatic toner. For the case of black and white printing, a single, black toner is used. For the case of color printing, multiple different color toners are used. Each toner is selectively attracted onto the photoconductive surface of the drum either exposed or unexposed to light, depending on the relative electrostatic charges on the photoconductive surface, characteristics of the development toner, and the type of toner used. Depending on the particular implementation, the photoconductive surface may be either positively or negatively charged, and the toner system similarly may contain negatively or positively charged particles.

The developed image is then transferred from the drum surface onto a sheet of paper. More particularly, a transfer roller is imparted with an electrostatic charge that is opposite to that of the toner. The transfer roller is rotated in proximity with the photoconductive surface of the drum. The transfer roller pulls the toner from the photoconductive surface, transferring the toner onto a charged sheet of paper. The transferred toner maintains the pattern of the image that was developed on the photoconductive surface.

In operation, a laser printer scans a laser beam horizontally across the photosensitive, electrically charged drum. By modulating the laser beam, resulting variations in charge will impart proportionate amounts of toner being deposited onto a sheet of paper.

More particularly, laser printers print pages of information onto individual sheets of paper by applying a particular toner, such as black toner for the case of gray scale printing, to selected small regions of fixed size referred to as pixels. By placing toner in only a portion of a pixel region, it is possible to create the effect of shades of gray. One technique for placing toner in only a portion of a pixel region uses a pulse width modulation (PWM) technique.

Complicating matters, new laser printers, including color laser printers, have attempted to incorporate more than one laser beam to scan the photosensitive drum that collects the toner in specific locations. Such multiple laser beams enable faster through-put while maintaining or increasing resolution.

However, a problem occurs if the lasers have different optical paths to the photosensitive drum because the pixel width becomes a function of the optical path. As a result, it becomes extremely difficult to ensure that both, or all, lasers will generate pixels of the same size and line alignment on the drum.

Laser printers are distinguished from other types of printers by their ability to place precise amounts of toner into very small regions of a page at relatively high speed. As a result, laser printers generate image quality that is far greater than most other types of printers. However, laser printers operate by scanning a photoconductive drum upon which a rendered image is held. This results in an intrinsic quantization of the image in the vertical direction of the page. Additionally, there exist limitations in circuitry that is used to modulate the horizontal scanning. These limitations result in quantization of the image so that a single cell, or pixel, is effectively formed. If pixels are made small enough, the quantization effects can be made imperceptibly small to the human eye. However, there are practical limits. First, the vertical quantization is limited by the scan rate and the speed with which the photoconductive drum is rotated. Secondly, horizontal quantization is limited by the ability to transfer data in serial form to the scanning laser. The horizontal quantization limits the number of transitions that modulate the scanning laser, thereby limiting the density of horizontal dots that are placed onto a printed page.

In an effort to increase the resolution capability of laser printers, various techniques have been used to increase the number of horizontal dot components of a laser. Irrespective of the technique used to generate horizontal dot components, the laser needs to be phase locked to a single signal edge referred to as a beam detect. The beam detect provides a reference signal that indicates when the scanning laser has begun to sweep across the photosensitive drum.

In operation, a pixel clock is phase locked to the beam detect signal. One technique uses a clock generator as described in U.S. Pat. Nos. 5,438,353 and 5,760,816 listing Applicant as the inventor, and describing a circuit providing one such clock generator. Such U.S. Pat. Nos. 5,438,353 and 5,760,816 are herein incorporated by reference.

More particularly, the error in dot placement using a clock generator described above on pixel boundaries can be substantially improved by using a phase adjusted pulse width modulator. See U.S. patent application Attorney Docket No. 10990775-1, entitled "Phase Adjusted Pulse Width Modulator", naming the inventor as Robert D. Morrison, which application describes one technique using phase locked pulse width modulation (PWM). Such U.S. Pat. Application Attorney Docket No. 10990775-1, is herein incorporated by reference. A standard phase locked loop cannot be used in this environment because it is not possible to generate an error signal that would correct the pixel dot clock. More particularly, there is only one beam detect edge that the pixel dot clock could lock phase to, and that phase is required to be rigidly maintained for the length of a scanned line.

Several recent attempts have been made to provide a laser printer that uses two laser diodes in order to reduce the mechanical scanning rotation rate. However, the above requirements become very difficult to meet when multiple lasers are used to scan a photosensitive drum. Currently, laser printers are pushing the limit of practical rotation rates for a scanner. Thus, a laser printer is able to run faster by slowing down the scanner, and scanning a pair of beams in parallel. Since the lasers are currently very close to each other such that the lasers tend to follow the same optical scan path, the same video frequency can be used for both laser modulation signals in order to generate pixels. However, the implementation of multiple lasers, particularly for color printing, necessitates the use of different laser optical scan paths that sweep different drum locations.

More particularly, when rendering solutions for color printer technology it is desirable to provide laser optical scan paths that sweep across significantly different drum locations to allow different colors to be deposited. If the lasers are positioned right next to each other, there would be no way to determine which scan would attract which color toner. In such situation, the optical path is significantly different, and attempts to ensure equal optical paths tend to be completely impractical or unrealizable. As a result, video frequency and pixel edge placement for each laser becomes difficult, if not impossible using presently available techniques.

Additionally, for single-color or gray-scale printing where multiple lasers have different optical paths, similar problems result and prior art solutions are inadequate or unacceptable.

Therefore, there exists a need for improved techniques for implementing multiple lasers on image forming devices.

SUMMARY OF THE INVENTION

A multiple laser system and method uses multiple optical laser paths and processing circuitry, such as multiple clock independent pulse width modulators, to generate a video signal for each laser in a manner that accommodates different video frequencies for each optical path. As a result, it is ensured that each optical scan path for each laser on a photosensitive drum will produce pixels of substantially identical width and location by ensuring that the laser modulation occurs with an appropriate frequency for each specific laser path.

According to one aspect, a system is provided for rendering an output image on an image transfer surface using multiple optical scan paths in an image rendering device. The system includes a plurality of lasers, a plurality of scan time detectors, and processing circuitry. Each of the lasers is configured to generate an optical scan path on the surface. Each scan time detector is associated with a corresponding laser and is operative to measure scan time of the laser along the respective optical scan path. The processing circuitry communicates with each scan time detector and is operative to generate a video signal having a video frequency associated with the scan time detected for the respective laser.

According to another aspect, an image forming device is provided for rendering an output image on a surface of a photoconductive drum using multiple optical laser paths. The image forming device includes a laser print engine having an image forming surface provided on a photoconductive drum. The laser print engine further includes a pair of lasers, a pair of scan time detectors, and a pair of pulse width modulators. Each laser is configured to generate a unique optical scan path on the drum surface. Each scan time detector is associated with a corresponding laser and is operative to measure the time it takes the laser to sweep across the associated optical scan path. Each pulse width modulator communicates with each laser and is operative to generate a video signal having a video frequency associated with the scan time detected for the respective laser.

According to yet another aspect, a method is provided for rendering an image onto an image transfer surface using multiple lasers. The method includes: providing a plurality of lasers each configured to generate an optical laser scan path onto an image transfer surface; detecting the time each laser takes to sweep the respective scan path; determining a unique video frequency for each scan path based on the respective sweep time; and driving each laser with the unique video frequency such that pixels will be produced by the plurality of lasers having substantially identical width and location.

DESCRIPTION OF THE DRAWINGS

Preferred embodiments of the invention are described below with reference to the following accompanying drawings depicting examples embodying the best mode for practicing the invention.

FIG. 2 is a logic flow diagram illustrating one method of implementing the apparatus and method for generating video signals for laser image forming devices that have multiple lasers and/or multiple optical paths.

DETAILED DESCRIPTION OF THE INVENTION

Figure 1:
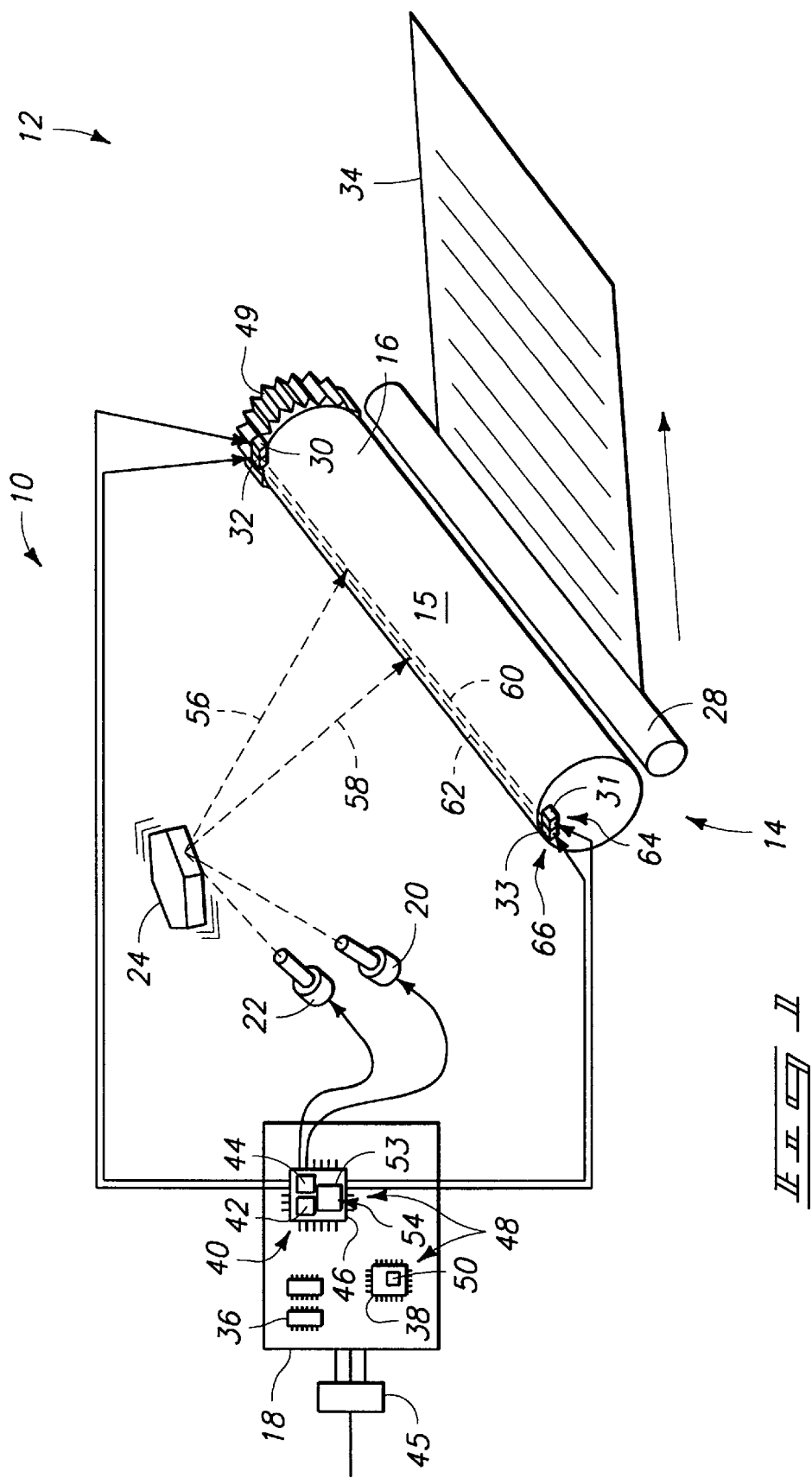
FIG. 1 is schematic block diagram of a multiple laser image transfer device according to one aspect of the invention.

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention. One exemplary implementation is described below and depicted with reference to the drawings comprising a system for generating and placing pixels via multiple lasers over multiple optical paths to accurately generate an output image by way of a laser printer. Although the present invention is described in terms of laser printer technology, it will be apparent to one of ordinary skill in the art that the present invention is equally applicable to other similar forms of image transfer technology, such as photocopying. Accordingly, while the invention is described via a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference as being presently understood in the art.

FIG. 1 illustrates a schematic block diagram of the present invention comprising a system for accurately placing pixels onto a photoconductive surface for holding an image to be printed onto paper identified generally by reference numeral 10. An image forming device, or image rendering device, 12 is illustrated in one form as a laser printer 14. Laser printer 14 includes photoconductive drum 16, printed circuit assembly (PCA) 18, laser diodes, or lasers, 20 and 22, mirror 24, transfer roller 28, and photodiodes 30–33.

Printed circuit assembly (PCA) 18 embodies the general formatter electronics for printing an image onto paper 34. PCA 18 includes memory 36, such as Random Access Memory (RAM), for holding an image to be printed; microprocessor 38, for processing the image to be printed; general circuitry 40; pulse width modulators (PWMs) 42 and 44; and input/output (I/O) interface 45 for connecting PCA 18 to separate computing components. General circuitry 40 is embodied in general ASIC circuitry 46. One or more of microprocessor 38, PWMs 42 and 44, and general circuitry 40 provides processing circuitry 48.

PCA 18 communicates with laser diodes 20 and 22 which each emit a laser beam 56 and 58, respectively. Laser beams 56 and 58 are reflected off rotating scanning mirror 24 and onto outer surface, or image transfer surface, 15 of drum 16 so as to define respective beam paths 60 and 62. Drum 16 is a photoconductive, electrically charged drum configured to hold an image to be transferred, or printed, onto transfer roller 28 and subsequently onto paper 34. Drum 16 includes a gear drive 49 that meshes for co-rotation with other gear drive components and a drive motor (not shown) of laser printer 14 which cooperate to rotate drum 16.

Although surface 15 is shown in one embodiment in the form of drum 16, it is understood that other forms are possible. For example, surface 15 can optionally be configured as a continuous, photoconductive belt (not shown) or other transfer medium whether photoconductive or not.

Laser diodes 20 and 22, each comprising a laser, cooperate with photoconductive drum 16, mirror 24, and transfer roller 28 to form a printer engine 52 that prints toner images onto paper 34. Printer engine 52 comprises a unit within printer 14 that performs actual printing onto paper 34. Printer engine 52 includes lasers 20 and 22 and associated mechanisms needed to transfer toner onto paper.

PWMs 42 and 44 each comprise a clock independent pulse width modulator (PWM) such as is described in Applicant's co-pending U.S. Patent Application entitled "Clock Independent Pulse Width Modulator", Attorney Docket No. 10991861-1, and listing the inventor as Robert D. Morrison. Such U.S. patent application Attorney Docket No. 10991861-1 is incorporated by reference as if fully disclosed herein. Each of PWM 42 and 44 uses a system clock from microprocessor 38 along with an edge placement algorithm 54 to generate a laser output signal that drives the respective lasers 20 and 22 at a required time.

PWMs 42 and 44 are used for each optical laser beam path 60 and 62, respectively. A scan timer, or scan time detector, 64 and 66 is provided along each beam path 60 and 62, respectively, in order to determine the scan time of each laser optical path. Scan timer 64 comprises photodiodes 30 and 31, pulse width modulator 42, memory 53, and general circuitry 40, wherein general circuitry 40 includes processing circuitry 48. Similarly, scan time 66 comprises photodiodes 32 and 33, pulse width modulator 44, memory 53, and 25 general circuitry 40, wherein general circuitry 40 includes processing circuitry 48. For example, photodiodes 30 and 31 are placed at the start and endpoints of laser beam path 60, while photodiodes 32 and 33 are placed at the start and endpoints of laser beam path 62. In this manner, photodiodes 30 and 32 are positioned in such a way that each laser beam 56 and 58 will hit start 30 photodiodes 30 and 32, respectively, before scanning across photosensitive drum 16. Upon completing each scan, laser beams 56 and 58 will hit end photodiodes 31 and 33, respectively.

Accordingly, start photodiodes 30 and 32 in combination with end photodiodes 31 and 33 are used to measure the sweep time from start to end for each scan across beam paths 60 and 62, respectively. Once measured, ratios are computed in order to obtain a video pixel period for each laser beam path 60 and 62. The value for each video pixel period is then sent to the corresponding PWM 42 and 44. Such value is then used to generate a laser output signal from each PWM 42 and 44 in order to drive the corresponding laser 20 and 22 at the required time.

A video pixel period for each laser is computed by forming a ratio of the measured scan times for the two optical scan paths. A video pixel frequency is then determined for one of the lasers which is defined by the mechanisms associated with the printer engine, including the laser and the optical scan path. In order to arrive at the pixel frequency for the second laser, a ratio of the scan time for the second laser over the scan time for the first laser is multiplied by the pixel frequency for the first laser. For example, the pixel frequency for a first laser can be 20.4 MHz. One exemplary ratio of scan times for the second laser covering a second scan path over the first laser covering a first scan path is 1.12761. Accordingly, a pixel frequency is calculated by multiplying 20.4 MHz by 1.12761, which equals 23.0032 MHz. For the case where the optical scan paths are coincident and identical, the ratio of scan times will be one to one (1:1). Accordingly, the scan frequencies will be one to one (1:1), and the pixel frequencies will be one to one (1:1). The video pixel period is the reciprocal of the video pixel frequency. The video pixel frequency is loosely related to the scan frequency, wherein the scan frequency includes scan time associated with scanning left and right margins which are devoid of any pixels. For the case where the left and right margins are nonexistent, the pixel frequency will equal the scan frequency minus the margin time, multiplied by the number of pixels per scan line.

PWMs 42 and 44 each comprise clock independent pulse width modulators that are used to generate video signals for lasers 20 and 22, respectively, and/or multiple optical paths for each laser. The provision of different optical paths 60 and 62 for each laser 20 and 22, respectively, requires that different video frequencies be delivered to each of lasers 20 and 22. Clock independent pulse width modulators 42 and 44 are utilized with lasers 20 and 22, respectively, for each optical path 60 and 62.

More particularly, a technique is provided for determining the sweep time for each of lasers 20 and 22 comprising the time that it takes for lasers 20 and 22, respectively, to transit completely across paths 60 and 62, respectively. Start diodes 30 and 32 and end diodes 31 and 33 cooperate over paths 60 and 62, respectively, in order to measure such sweep time. When exposed to light from one of lasers 20 and 22, diodes 30–33 generate a detectable response such that sweep time can be calculated by monitoring the time it takes for a laser beam to transit from a start diode to an end diode.

The measured sweep time is then used to determine a video frequency which is required for each path 60 and 62, and the resulting information is then sent to the corresponding clock independent pulse width modulator 42 and 44, respectively. Accordingly, this technique ensures that each laser scan path 60 and 62 on drum 16 will produce pixels of substantially identical width and location by ensuring that laser modulation occurs with a specifically tailored frequency for that particular laser path.

FIG. 2 discloses a logic flow diagram for the programming of general circuitry, or processing circuitry, of system 10 depicted above with reference to FIG. 1. The following steps list a method for rendering an image onto an image transfer surface using multiple lasers.

In Step "S1", a plurality of lasers are provided. Each laser is configured to generate an optical scan path onto an image transfer surface. After performing Step "S1", the process proceeds to Step "S2".

In Step "S2", the process detects the time each laser takes to sweep, or scan, the respective scan path. After performing Step "S2", the process proceeds to Step "S3".

In Step "S3", the process determines a unique video frequency for each scan path based on the respective sweep, or scan, time. After performing Step "S3", the process proceeds to Step "S4".

In Step "S4", the process drives each laser with the unique video frequency such that pixels are produced by the plurality of lasers having substantially identical width and location. After performing Step "S4", the process is terminated.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A system for rendering an output image on an image transfer surface using multiple optical scan paths in an image rendering device, the system comprising:

a plurality of lasers each configured to generate an optical scan path on the surface;

a plurality of scan time detectors, one scan time detector associated with each laser and operative to measure a scan time of the laser along the respective optical scan path; and processing circuitry communicating with each scan time detector and operative to generate a video signal having a video frequency associated with the scan time detected for the respective laser, the detected scan time from one laser being compared with the detected scan time from another laser, and a ratio of the scan times being used to scale a video pixel period for the one laser with respect to a video pixel period for the another laser.

2. The system of claim 1 wherein each scan time detector comprises a pair of photodiodes, wherein the photodiodes are provided at opposite ends of a respective optical scan path.

3. The system of claim 1 wherein one of the photodiodes is a start photodiode placed at a start point of the optical scan path and the other photodiode is an end photodiode placed at an end point of the optical scan path.

4. The system of claim 1 wherein the image transfer surface is a photoconductive drum, and each optical scan path extends along the photoconductive drum.

5. The system of claim 1 wherein the processing circuitry instantaneously communicates with each scan time detector and immediately generates the video signal having an exact video frequency associated with the scan time for each respective laser.

6. The system of claim 1 wherein the computed video pixel period is input to the processing circuitry, and wherein a laser output signal is generated from the processing circuitry operative to drive the associated laser at a required time.

7. The system of claim 1 wherein the processing circuitry comprises a clock independent pulse width modulator.

8. The system of claim 1 wherein the processing circuitry comprises a pulse width modulator provided for each laser, each pulse width modulator operative to generate the video signal having a unique video frequency associated with the scan time detected for the respective laser.

9. The system of claim 1 wherein each optical scan path has a unique video frequency.

10. An image forming device for rendering an output image on a surface of a photoconductive drum using multiple optical laser paths, the system comprising:

a laser print engine having an image forming surface provided on the photoconductive drum, the laser print engine further including;

(a) a pair of lasers each configured to generate a unique optical scan path on the drum surface;

(b) a pair of scan time detectors, one scan time detector associated with each laser and operative to measure the time it takes the laser to sweep across the associated optical scan path; and (c) a pair of pulse width modulators, one pulse width modulator communicating with each laser and operative to generate a video signal having a video frequency associated with the scan time detected for the respective laser;

(d) wherein the detected scan time from one laser is compared with the detected scan time from another laser, and a ratio of the scan times is used to scale the video pixel period for the one laser with respect to the video pixel period for the other laser.

11. The image forming device of claim 10 wherein each scan time detector comprises a pair of photodiodes provided at opposite ends of one of the optical scan paths.

12. The image forming device of claim 11 wherein each scan time detector further comprises processing circuitry operative to calculate scan time comprising the time it takes for a laser to sweep across an optical scan path.

13. The image forming device of claim 10 wherein each laser comprises a laser diode.

14. The image forming device of claim 10 wherein each pulse width modulator receives a unique video frequency such that the corresponding laser is driven with a unique video pixel period such that each laser produces pixels of substantially identical width and location on the surface.

15. A method of rendering an image onto an image transfer surface using multiple lasers, comprising:

providing a pair of lasers each configured to generate an optical scan path onto the image transfer surface;

detecting the time each laser takes to sweep the respective scan path;

determining a unique video frequency for each scan path based on the respective sweep time comprising computing a ratio of sweep time for each laser to obtain a video pixel period for each laser scan path; and driving each laser with the unique video frequency such that pixels will be produced by the pair of lasers having substantially identical width and location.

16. The method of claim 15 wherein the step of detecting the sweep time comprises optically detecting the start and end times for each laser when sweeping across the respective scan path.

17. The method of claim 15 wherein the step of determining a unique video frequency for each scan path comprises instantaneously communicating with a respective scan time detector that detects the time a respective laser takes to sweep the respective scan path and immediately generating a video signal having an exact video frequency associated with the scan time detected for the respective laser.

18. The method of claim 15 wherein a start photodiode and an end photodiode are provided at opposite end points of each optical scan path in such a way that a respective laser will optically hit the start photodiode, scan the surface, and then optically hit the end photodiode.

19. The method of claim 15 wherein the unique frequency is received by a clock independent pulse width modulator, and wherein the clock independent pulse width modulator drives the laser with the unique video frequency.

* * * * *